(12) United States Patent
Kim

(10) Patent No.: US 11,399,350 B2
(45) Date of Patent: Jul. 26, 2022

(54) METHOD OF CONTROLLING TERMINAL OUTPUT POWER DURING CARRIER AGGREGATION AND APPARATUS THEREFOR

(71) Applicant: SK Telecom Co., Ltd., Seoul (KR)

(72) Inventor: Byeong Cheol Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 149 days.

(21) Appl. No.: 16/863,252

(22) Filed: Apr. 30, 2020

(65) Prior Publication Data

US 2020/0329438 A1 Oct. 15, 2020

Related U.S. Application Data

(63) Continuation of application No. PCT/KR2018/009718, filed on Aug. 23, 2018.

(30) Foreign Application Priority Data

Oct. 30, 2017 (KR) .......................... 10-2017-0142799

(51) Int. Cl.
*H04W 52/36* (2009.01)
*H04W 28/02* (2009.01)
(Continued)

(52) U.S. Cl.
CPC ..... *H04W 52/367* (2013.01); *H04W 28/0268* (2013.01); *H04W 52/146* (2013.01); *H04W 52/241* (2013.01); *H04W 52/365* (2013.01)

(58) Field of Classification Search
CPC . H04W 72/04; H04W 24/02; H04W 28/0257; H04W 28/0268; H04B 7/26; H04L 12/16
See application file for complete search history.

(56) References Cited

U.S. PATENT DOCUMENTS 9,504,021 B1 * 11/2016 Wurtenberger ..... H04L 65/1016
10,356,631 B1 * 7/2019 Pawar ................... H04W 36/06
(Continued)

FOREIGN PATENT DOCUMENTS

| JP | 2016-129407 A | 7/2016 |
| JP | 2017-34724 A | 2/2017 |

(Continued)

OTHER PUBLICATIONS

International Search Report dated Nov. 20, 2018, in connection with corresponding International Patent Application No. PCT/KR2018/009718, citing the above references with English translation.

*Primary Examiner* — Tejis Daya
(74) *Attorney, Agent, or Firm* — Hauptman Ham, LLP

(57) ABSTRACT

The present disclosure provides a method of controlling an output power of a terminal during a carrier aggregation operation and an apparatus suitable for the method. During the carrier aggregation operation, the terminal may control the power allocation such that more transmission power is allocated for the primary cell when there exists a bearer established already for a particular service such as the VoLTE service, so as to facilitate high quality services according to a service using situation of the terminal.

8 Claims, 4 Drawing Sheets

(a)

(b)

(51) Int. Cl.
    *H04W 52/14*     (2009.01)
    *H04W 52/24*     (2009.01)

(56)          References Cited

U.S. PATENT DOCUMENTS 10,813,157 B1*  10/2020  Bai ..................... H04W 16/28
 2010/0330992 A1*  12/2010  Bhattacharjee ..... H04W 52/028
                                                        455/436
 2013/0215811 A1*   8/2013  Takaoka ............ H04W 28/0268
                                                        370/311
 2016/0337732 A1*  11/2016  Al-Walaie ........... H04L 41/0672
 2016/0345217 A1*  11/2016  Tabet .................. H04B 17/382
 2017/0019864 A1*   1/2017  Hwang ............. H04W 52/0206
 2017/0187446 A1*   6/2017  Buesker ............ H04B 7/15557

FOREIGN PATENT DOCUMENTS

KR    10-2014-0144091 A    12/2014
 KR    10-2015-0043849 A     4/2015
 KR    10-2016-0105075 A     9/2016
 KR    10-2017-0035601 A     3/2017

\* cited by examiner (a)  (b)

(a)

(b)

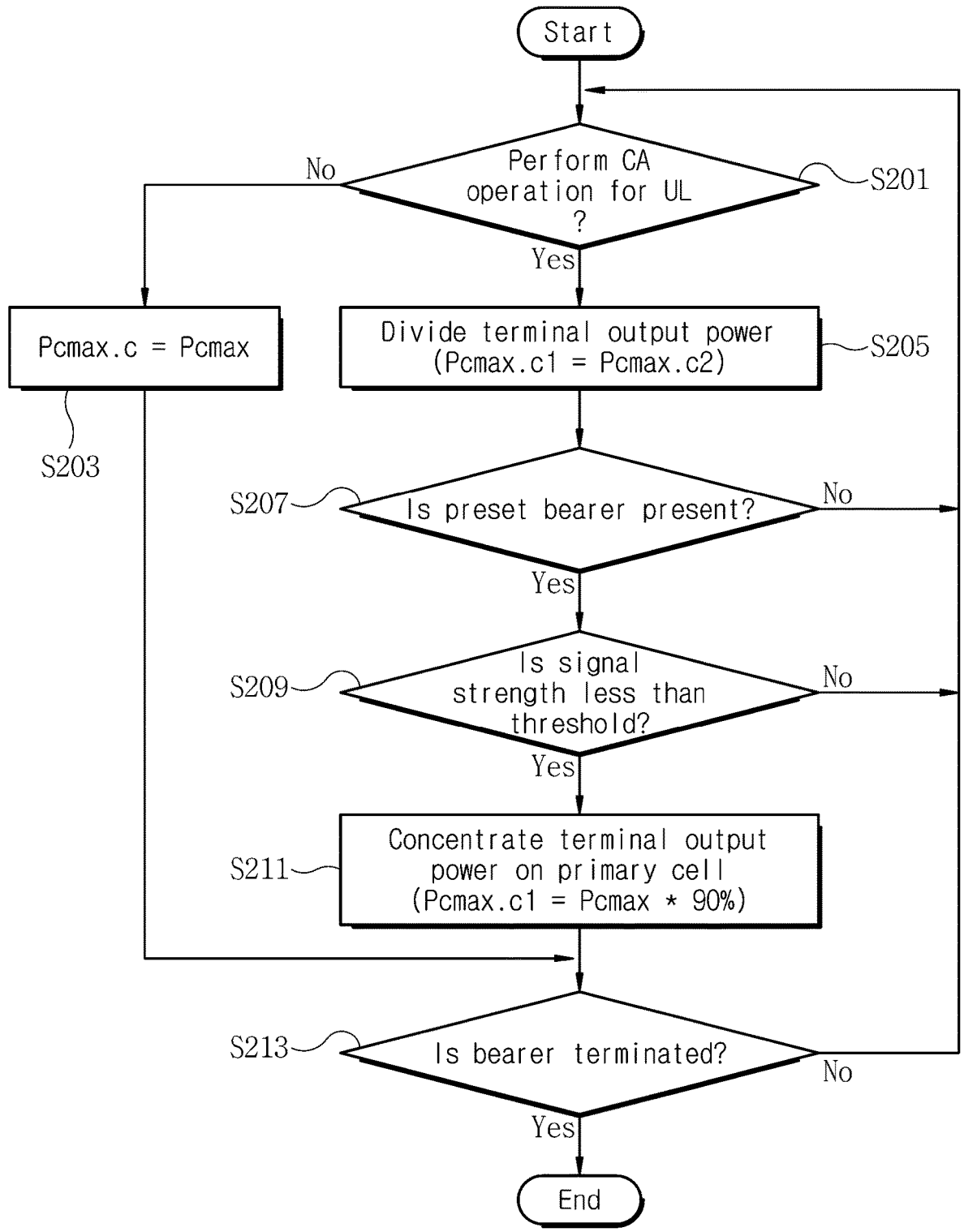

METHOD OF CONTROLLING TERMINAL OUTPUT POWER DURING CARRIER AGGREGATION AND APPARATUS THEREFOR

CROSS-REFERENCE TO RELATED APPLICATIONS

The present application is a continuation of International Patent Application No. PCT/KR2018/009718, filed on Aug. 23, 2018, which is based upon and claims the benefit of priority to Korean Patent Application No. 10-2017-0142799, filed on Oct. 30, 2017 in the Korean Intellectual Property Office, the disclosure of which is incorporated by reference herein in their entirety.

TECHNICAL FIELD

The present disclosure relates to a method of controlling an output power of a terminal and, more particularly, to a method of controlling the output power of the terminal during a carrier aggregation operation, which variably controls the output power for each carrier according to a type of a service to control the quality of service of the terminal when the terminal performs the carrier aggregation operation. Also, the present disclosure relates to an apparatus suitable for the method.

BACKGROUND ART

The description in this section merely provides background information of embodiments of the present disclosure and is not intended to specify prior arts of the present disclosure.

As mobile communication technology evolves, a carrier aggregation which combines two or more carriers into one data channel has been introduced to mobile communication systems in order to increase a bandwidth of the channel between the terminal and a base station and thereby increase a bitrate.

The carrier aggregation is a technique that combines a plurality of frequency bands to form a wider frequency band and assign to a single user so that the user communicates with the base station over the plurality of frequency bands simultaneously. For example, in a system where two frequency bands in 850 MHz and 1.8 GHz are available and the base station and the terminal can communicate with each other at a bitrate of 75 Mbps over one of the frequency bands in 850 MHz or 1.8 GHz, the carrier aggregation allows to use both the frequency bands in 850 MHz and 1.8 GHz simultaneously and communicate at a bitrate of 150 Mbps. Since the cell coverages for the frequency bands may be different from each other, a terminal having the carrier aggregation capability may either use the frequency bands in 850 MHz and 1.8 GHz simultaneously or communicate over a single frequency band in 850 MHz or 1.8 GHz depending on a location of the terminal or a signal receiving condition.

When the carrier aggregation is used, the terminal performs communications with two or more cells simultaneously over respective frequency bands. One of the cells is referred to as a primary cell (PCell) and the other cells are referred to as secondary cells (SCell). The terminal first establishes an RRC connection to the primary cell to communicate with each other and, when additional radio resources are needed, may establish the RRC connection to the secondary cell also to communicate with both the primary cells and the secondary cells simultaneously.

The terminal performing the carrier aggregation operation evenly distributes the output power to a plurality of carriers used to communicate with respective connected cells. However, since the coverage of an existing LTE network is designed to be optimized to a maximum output power of the terminal, 23 decibel-milliwatts (dBm), the average output power for each carrier is lowered by 3 dB during the carrier aggregation operation than in a common single carrier operation, and a problem of output power shortage in the terminal may occur particularly near a cell edge region. Such a problem may cause a degradation of a service quality, e.g., an occurrence of a call drop during a use of a particular service such as VoLTE.

SUMMARY

To solve the above problem, the present disclosure provides a method of controlling an output power of a terminal having a carrier aggregation capability, which variably controls the output power for each carrier according to a type of a service to control the quality of service of the terminal when the terminal performs a carrier aggregation operation, and an apparatus suitable for the method.

In particular, the present disclosure provides a method of controlling an output power of a terminal during a carrier aggregation operation and an apparatus suitable for the method, in which the terminal determines the existence of a bearer established already while performing the carrier aggregation operation to control the power allocation such that more transmission power is allocated for the primary cell when there exists a bearer established already for a particular service such as the VoLTE service, so as to facilitate high quality services according to a service using situation of the terminal.

Additional aspects will be set forth in part in the description which follows and, in part, will be apparent from the description, or may be learned by practice of the presented exemplary embodiments.

According to an aspect of an exemplary embodiment, a method of controlling an output power of a terminal during a carrier aggregation executable in an apparatus supporting the carrier aggregation in a wireless communication system is provided. The method includes: setting communications with a primary cell and a secondary cell according to a carrier aggregation operation; performing a power control such that transmission powers for the primary cell and the secondary cell are divided within a range of a maximum transmission power; and, when a bearer established already is identified, determining the transmission powers for the primary cell and the secondary cell such that more transmission power is applied to the primary cell than to the secondary cell.

The bearer established already may be identified through a quality of service class identifier (QCI).

When the bearer for a packet-based voice call service is identified from the quality of service class identifier, the transmission powers for the primary cell and the secondary cell may be determined such that more transmission power is applied to the primary cell than to the secondary cell.

The operation of determining the transmission powers may include: determining whether a reference signal received power (RSRP) is less than a predetermined threshold when the bearer established already is identified, and determining the transmission powers for the primary cell and the secondary cell such that more transmission power is applied to the primary cell than to the secondary cell when it is determined that the reference signal received power is less than the predetermined threshold.

After determining the transmission powers, a power headroom report (PHR) including information on the transmission power determined for each cell may be transmitted to a base station.

According to an aspect of an exemplary embodiment, provided is a non-transitory computer-readable storage medium storing programs thereon. When executed by a processor on a user device, the instructions causes the processor to execute the above method.

According to an aspect of an exemplary embodiment, an apparatus supporting a carrier aggregation in a wireless communication system, includes: a carrier aggregation processor configured to set communications with a primary cell and a secondary cell according to a carrier aggregation operation; a determiner configured to determine whether there exists a bearer established already while the carrier aggregation operation is performed by the carrier aggregation processor; and a power controller configured to divide transmission powers for the primary cell and the secondary cell within a range of a maximum transmission power during the carrier aggregation operation, and determine the transmission powers for the primary cell and the secondary cell such that more transmission power is applied to the primary cell than to the secondary cell when the bearer established already is identified to exist by the determiner.

The bearer established already may be identified through a quality of service class identifier (QCI).

When the bearer established already is identified, the determiner may determine whether a reference signal received power (RSRP) is less than a predetermined threshold. When it is determined that the reference signal received power is less than the predetermined threshold, the power controller may determine the transmission powers for the primary cell and the secondary cell such that more transmission power is applied to the primary cell than to the secondary cell.

The power controller may transmit a power headroom report (PHR) including information on the transmission power determined for each cell to a base station.

According to the method and apparatus for controlling the output power of the terminal during the carrier aggregation operation according to exemplary embodiments of the present disclosure, the terminal having the carrier aggregation capability variably controls the output power for each carrier according to the type of the service to control the quality of service of the terminal when the terminal performs a carrier aggregation operation.

In particular, the terminal according to the present disclosure determines the existence of a bearer established already while performing the carrier aggregation operation to control the power allocation such that more transmission power is allocated for the primary cell when there exists a bearer established already for a particular service such as the VoLTE service, so as to facilitate high quality services according to a service using situation of the terminal and prevent the occurrence of a problem that may arise while the particular service such as the VoLTE service is provided.

Further advantages and areas of applicability will become apparent from the description of exemplary embodiments provided herein.

DESCRIPTION OF DRAWINGS

FIG. 5 is a flowchart illustrating a method of controlling the terminal output power during the carrier aggregation operation according to another exemplary embodiment of the present disclosure.

DETAILED DESCRIPTION

Figure 1:
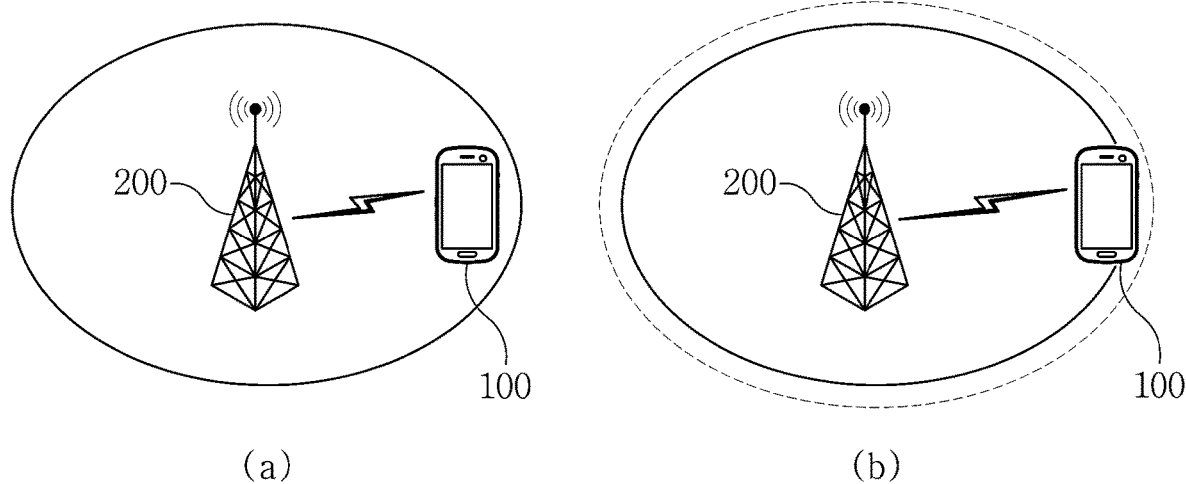
FIG. 1 is a diagram illustrating a wireless communication system according to an exemplary embodiment of the present disclosure.

For a more clear understanding of the features and advantages of the present disclosure, exemplary embodiments of the present disclosure will be described in detail with reference to the accompanied drawings. In the following description and the accompanied drawings, detailed descriptions of well-known functions or configuration that may obscure the subject matter of the present disclosure will be omitted for simplicity. The exemplary embodiments described in this specification and the configurations shown in the drawings are not intended to limit the technical idea of the present disclosure, and thus it should be understood that there may exist various equivalents and modifications which may substitute the exemplary embodiments within the scope of the present disclosure.

When a component is referred to as being "connected" or "coupled" to another component, it means that the component is connected or may be connected logically or physically to the other component. In other words, it is to be understood that the component or may be connected or coupled to the other component indirectly through an object therebetween instead of being directly connected or coupled to the other component.

The terminologies are used herein for the purpose of describing particular embodiments only and are not intended to limit the disclosure. The singular forms include plural referents unless the context clearly dictates otherwise. Also, the expressions "~comprises," "~includes," "~constructed," "~configured" are used to refer a presence of a combination of enumerated features, numbers, processing steps, operations, elements, or components, but are not intended to exclude a possibility of a presence or addition of another feature, number, processing step, operation, element, or component.

Now, a method of controlling a terminal output power during a carrier aggregation operation and an apparatus therefor according to an exemplary embodiment of the present disclosure will be described in detail with reference to the drawings. It is to be noted that the same components are designated by the same reference numerals throughout the drawings. In order to avoid obscuring the subject matter of the present disclosure, well-known configurations or devices may be omitted or be represented by blocks in a block diagram form focusing on core functions of the configurations or devices.

First, a wireless communication system according to an exemplary embodiment of the present disclosure will be described.

FIG. 1 illustrates a wireless communication system according to an exemplary embodiment of the present disclosure, which is widely deployed in order to provide diverse telecommunication services for voice, packet data, and the like. The wireless communication system may include a terminal 100 and a base station 200.

The terminal 100 is a general term referring to a user equipment (UE) receiving the telecommunication services in the wireless communication system and may be referred to as another term such as a mobile station (MS), user terminal (UT), subscriber station (SS), wireless device, and so on.

The base station 200 is a station communicating with the terminal 100 and may be referred to as another term such as a Node-B, evolved Node-B (eNB), sector, site, base transceiver system (BTS), access point, relay node, remote radio head (RRH), radio unit (RU), and small cell. In particular, the base station 200 according to the present disclosure can transmit a signal over a plurality of frequency bands. Though a coverage supported by each base station 200 is indicated by a circle, it should be understood that the actual coverage of the base station 200 may include irregular and complex boundaries.

The terminal 100 may change its position according to a movement of its user and may consecutively move from a cell coverage of the base station 200 into a coverage of another base station. When the terminal 100 is located within the coverage of a particular base station 200, the terminal 100 may receive signals of a plurality of frequency bands transmitted by the base station 200. The terminal 100 according to the present disclosure may select one of the signals of a plurality of frequency bands to establish a radio resource control (RRC) connection to the base station 200 and perform data communications through a selected frequency band as shown in a left side (a) of FIG. 1. During such a process, the terminal 100 may inform the base station 200 that it supports a carrier aggregation (CA) functionality, and the base station 200 may check that the terminal 100 supports the CA capability.

Afterwards, if the terminal 200 determines that more radio resources are needed, the terminal 100 may search for another cell through an RRC connection reconfiguration procedure to establish the RRC connection to a discovered cell and perform communications with both cells at the same time in a carrier aggregation state as shown in a right side (b) of FIG. 1. Here, each of the frequency bands selected while the carrier aggregation is applied is referred to as component carriers (CC), and the plurality of component carriers selected in the carrier aggregation are collectively referred to as a carrier combination. The frequency band has a center frequency and a bandwidth calculated with respect to the center frequency.

When the carrier aggregation is used, the terminal 100 performs communications with a plurality of cells simultaneously over respective frequency bands. In other words, there exist a plurality of serving cells, one for each component carrier. The serving cells may be categorized into a primary cell (PCell) and a secondary cell (SCell). For example, in the case that terminal 100 communicates with two serving cells simultaneously, one of the serving cells is the primary cell (PCell) and the other serving cell is the secondary cell (SCell). In this case, the terminal 100 first establishes the RRC connection to the primary cell to communicate with each other and, when additional radio resources are needed, may establish the RRC connection to the secondary cell also to communicate with both serving cells simultaneously. Even though the terminal 100 receives downlink data from the two serving cells, the terminal 100 may transmit uplink data only to the base station 200 of the primary cell. Further, a system information acquisition and a handover control may be performed through the primary cell only.

Though it was described in the above example that the terminal 100 is connected to two base stations 200 of respective serving cells when the carrier aggregation is used, the number of the serving cells is not limited to two. For example, according to Release 13 of the 3rd Generation Partnership Project (3GPP), the number of cells that can be allocated at the same time in the carrier aggregation has been increased up to 32. In other words, the number of secondary cells that can be configured simultaneously with the primary cell may be chosen from a range of 1 to 31 rather than being necessarily only one.

Meanwhile, when the carrier aggregation is used, the terminal 100 may transmit signals in its maximum terminal transmission power for the primary cell and the secondary cell. Here, the maximum terminal transmission power (Pcmax) means a maximum transmission power that is allowable for an uplink transmission in the serving cell. In other words, when the terminal 100 performs the carrier aggregation operation using two frequency bands simultaneously, the maximum terminal transmission power of the terminal 100 means a maximum transmission power available in the two frequency bands. For example, in case that the maximum transmission power of the terminal 100 is 10 Watts, the terminal 100 performs a scheduling such that the total transmission power for the primary cell and the secondary cell that serve to the terminal 100 is less than 10 Watts. At this time, the terminal 100 may perform a power control such that output powers for the primary cell and the secondary cell are set to be similar to each other. In such a case, however, a problem such as a call drop may occur when the terminal 100 transmits or receives a large amount of data to or from the primary cell and the secondary cell at the same time, such as when using a VoLTE service.

In order to solve such a problem, the system and method according to the present disclosure performs the power control such that more transmission power is allocated to the primary cell than the secondary cell when it is determined that there exists a bearer established already when a uplink carrier aggregation is to be used.

This process will now be described in more detail.

Figure 2:
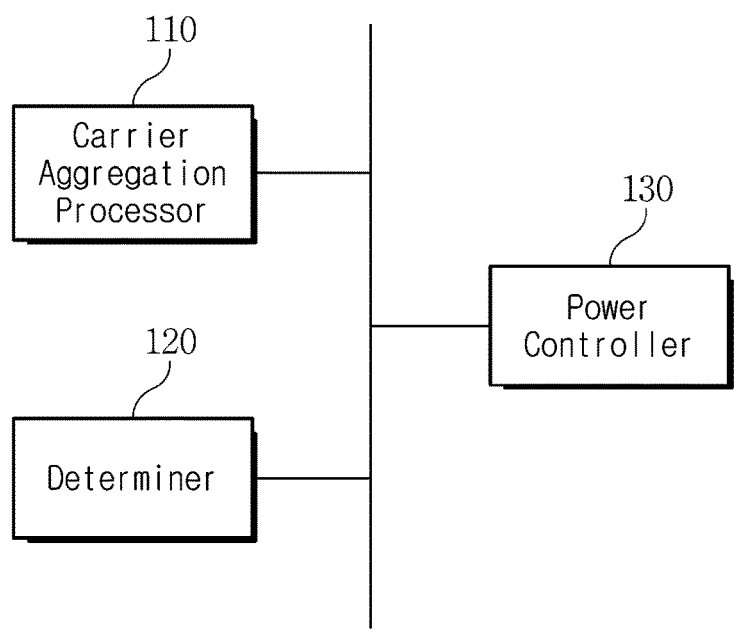
FIG. 2 is a block diagram of a terminal according to an exemplary embodiment of the present disclosure.

FIG. 2 is a block diagram of the terminal according to an exemplary embodiment of the present disclosure.

Referring to FIG. 2, the terminal 100 according to an exemplary embodiment of the present disclosure may include a carrier aggregation processor 110, a determiner 120, and a power controller 130. It should be noted that the configuration of the terminal 100 shown in the drawing illustrates only essential elements for performing the functional operation of the terminal 100 according to an exemplary embodiment, and the terminal 100 may be configured to include more hardware or software components.

The carrier aggregation processor 110 performs a carrier aggregation operation according to an embodiment of the present disclosure. In particular, the carrier aggregation processor 110 according to the present disclosure may perform the carrier aggregation operation after the terminal 100 establishes the RRC connection with a cell if it is determined that more radio resources are needed according to a user input or an occurrence of a predetermined event. The carrier aggregation processor 110 may perform the carrier aggregation operations independently for uplink (UL) and downlink (DL). For example, the carrier aggregation processor 110 may aggregate three frequency bands for the downlink under the control of the base station 200 while aggregating two frequency bands for the uplink.

The determiner 120 may determine whether an uplink carrier aggregation operation is performed by the carrier aggregation processor 110, and may determine whether there exists a bearer established already when the uplink carrier aggregation operation is being performed. The determiner 120 may determine whether there exists a bearer established already by checking a quality-of-service (QoS) class identifier (QCI).

The quality-of-service class identifier (QCI) is a parameter that defines a priority as an integer value in order to ensure the quality of service in a Long Term Evolution/IP Multimedia Subsystem (LTE/IMS) network defined by a 3GPP Technical Specification, 3GPP TS23.203. The determiner 120 according to the present disclosure may check the quality-of-service class identifier to determine whether the quality-of-service class identifier is a predefined identifier or not. Although the determiner 120 checks the quality-of-service class identifier in the present exemplary embodiment to determine whether there exists a bearer established already, the present disclosure is not limited thereto. For example, the determiner 120 may check other information such as an access point name (APN) instead of the quality-of-service class identifier.

In addition, the determiner 120 may determine whether a particular service such as a packet-based voice call service is generated by checking the quality-of-service class identifier. If the determiner 120 determines that there happens a predetermined service such as the packet-based voice call service, the determiner 120 provides a determination result to the power controller 130.

Further, after determining whether there exists a bearer established already by checking the quality-of-service class identifier, the determiner 120 may check a reference signal received power (RSRP) to determine whether the reference signal received power is less than a predetermined threshold. If the determiner 120 determines that the reference signal received power is less than the predetermined threshold (e.g. 100 decibel-milliwatts (dBm)), which indicates a weak signal strength, the determiner 120 may provide a determination result to the power controller 130.

The power controller 130 performs a role of controlling the output power of the terminal 100. In particular, the power controller 130 calculates the maximum transmission power (Pcmax) for each activated carrier, calculates a power headroom based on a calculated maximum transmission power (Pcmax), and reports the power headroom to the base station 200.

In general, the terminal 100 should provide the base station 200 with transmission power information so that the uplink transmission does not cause any interference with transmissions in another frequency bands. At this time, the power controller 130 may transmit scheduling information including a buffer status report (BSR) and a power headroom report (PHR) to the base station 200, so that a power control at the base station 200 may be accomplished. The power headroom may be calculated as a difference between the maximum transmission power (Pcmax) that can be used by the terminal 100 and the transmission power currently being used by the terminal 100 for the uplink transmission. Thus, the power controller 130 according to the present disclosure calculates the maximum transmission power (Pcmax), checks the power headroom based on the calculated maximum transmission power (Pcmax), and reports a power headroom level to the base station 200.

Also, the power controller 130 may evenly allocate transmission power to each of the serving cells including the primary cell and the secondary cell when the carrier aggregation is used. The maximum transmit power (PCMAX) mentioned above refers to a maximum power allowable for the uplink transmission to the serving cells. When the terminal 100 performs the carrier aggregation operation and uses two frequency bands simultaneously, the power controller 130 may control the transmission powers for the serving cells by evenly dividing the transmission powers for the serving cells such that the sum of the transmission powers for a plurality of activated frequency bands does not exceed the maximum transmission power.

In addition, the power controller 130 may perform the power control such that more transmission power is allocated to the primary cell than the secondary cell according to the determination result from the determiner 120.

The configuration of the terminal 100 according to an exemplary embodiment of the present disclosure has been described above, and the operation of the terminal according to the present disclosure will be described below in more detail with reference to the drawings.

A processor mounted in the terminal 100 according to an exemplary embodiment of the present disclosure may process program instructions for executing the method according to the present disclosure. The processor may be a single-threaded processor in one implementation while the processor may be a multithreaded processor in another implementation. Furthermore, the processor may be capable of processing instructions stored in a memory or storage devices.

Meanwhile, although the terminal 100 according to an exemplary embodiment of the present disclosure is illustrated in FIG. 2 from a functional point of view to include only the carrier aggregation processor 110, the determiner 120, and the power controller 130, the present disclosure is not limited thereto. For example, the terminal 100 may further include various components such as an input device (not shown), an output device (not shown), a storage (not shown), and a communication device (not shown) that support user input, output, and so on.

Hereinbelow, a method of controlling a terminal output power during a carrier aggregation operation according to an exemplary embodiment of the present disclosure will be described with reference to flowcharts.

Figure 3:
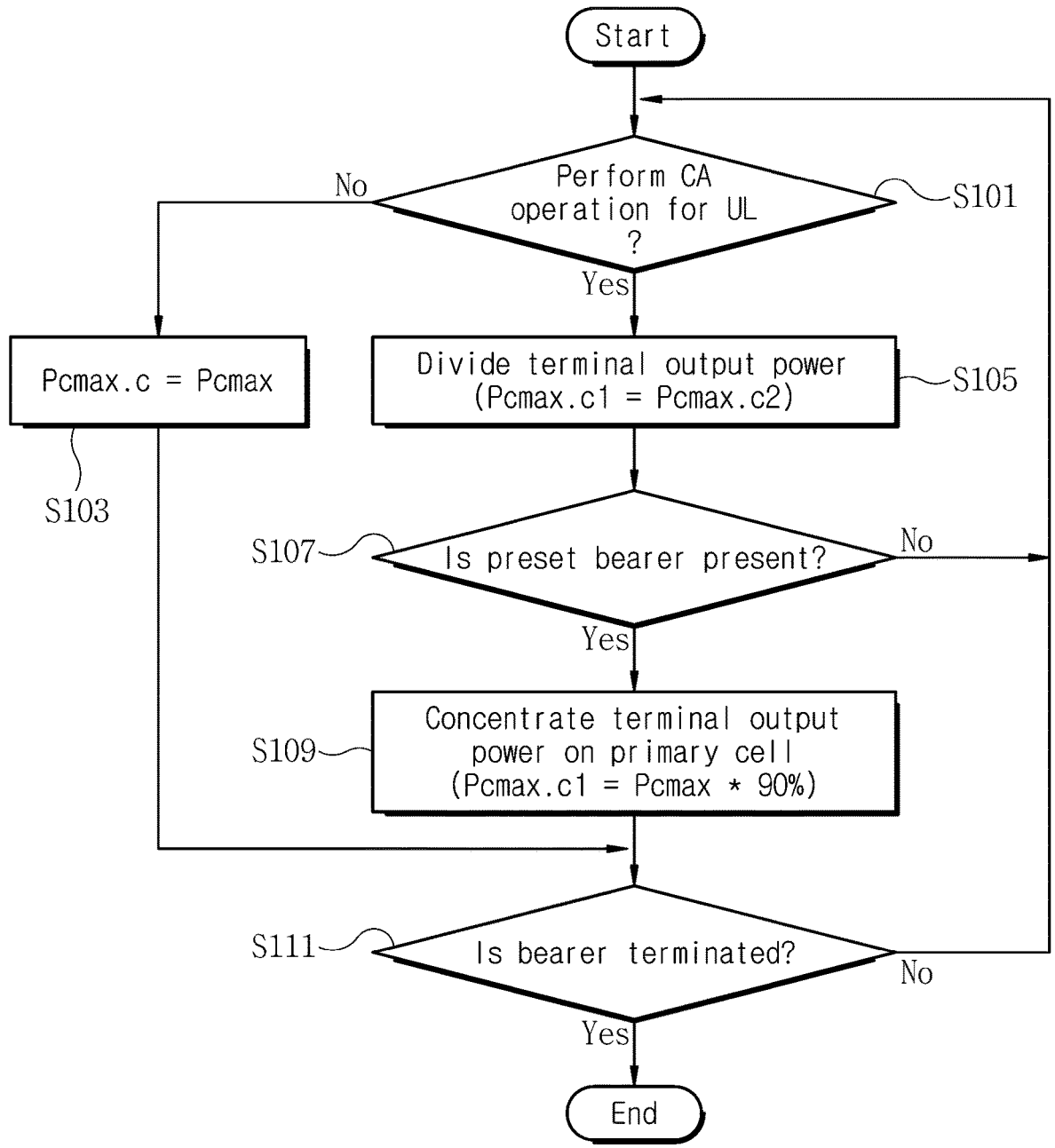
FIG. 3 is a flowchart illustrating a method of controlling a terminal output power during a carrier aggregation operation according to an exemplary embodiment of the present disclosure.
Figure 4:
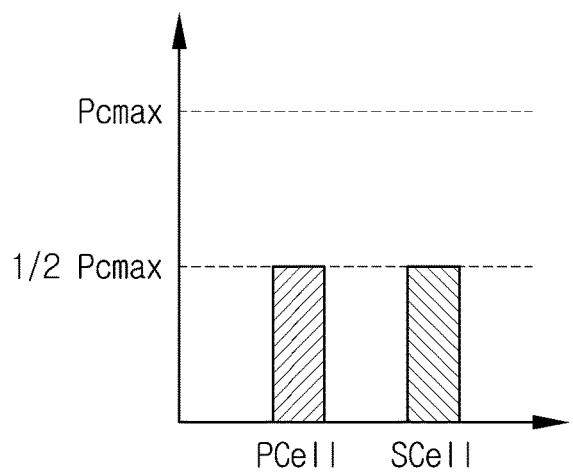
FIG. 4 is a graph for describing the method of controlling the terminal output power during the carrier aggregation operation according to an exemplary embodiment of the present disclosure.
Figure 4:
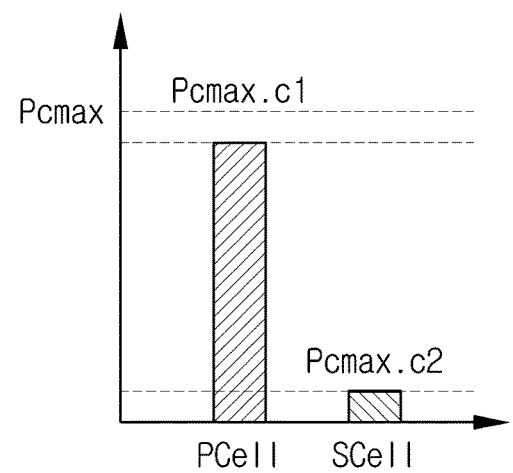

FIG. 3 is a flowchart illustrating a method of controlling the terminal output power during the carrier aggregation operation according to an exemplary embodiment of the present disclosure, and FIG. 4 is a graph for describing the method of controlling the terminal output power during the carrier aggregation operation according to an exemplary embodiment of the present disclosure.

First, referring to FIG. 3, the terminal 100 of the present disclosure may be located in within a communication coverage of a particular base station 200 and may receive signals of various frequency bands transmitted by the base station 200. At this time, the terminal 100 may select one of signals of the various frequency bands transmitted by the base station 200 to establish the RRC connection and perform the data communications over the frequency band.

Afterwards, when it is determined that more radio resources are needed, the terminal 100 may search for another cell through an RRC connection reconfiguration procedure and establish the RRC connection with a discovered cell to use the carrier aggregation in which the terminal 100 simultaneously communicates both cells. The carrier aggregation may be set up for the uplink transmission, and may also be set up for the downlink transmission.

The terminal 100 may set up the carrier aggregation for the uplink to use two frequency bands simultaneously (S101). In such a case, the terminal 100 communicates with two cells, each of which serves as the serving cell. The serving cells may be categorized into the primary cell (PCell) and the secondary cell (SCell). In the case that terminal 100 communicates with two serving cells at the same time, one of the serving cells is the primary cell (PCell) and the other serving cell is the secondary cell (SCell). The terminal 100 first establishes the RRC connection to the primary cell to communicate with each other and, if additional radio resources are needed, may establish the RRC connection to the secondary cell also to communicate with both serving cells at the same time.

When the carrier aggregation is to be performed (S101) in a state that the maximum transmission power is allocated only to the primary cell (S103), the terminal 100 evenly divides the maximum transmission power for each of the primary cell and the secondary cell (S105). Here, the phrase "evenly dividing the maximum transmission power" is used herein to mean that the maximum transmission power is divided for each cell such that the sum of the maximum transmission powers for all the activated frequency bands does not exceed the maximum transmission power available for the terminal 100 as shown in a left side (a) of FIG. 4. For example, in case that the maximum transmission power available for all the serving cells in the terminal 100 is 10 W, the sum of the maximum transmission powers for the primary cell and the secondary cell should be equal to or less than 10 W. As such, the terminal 100 may divide the maximum transmission powers of the primary cell and the secondary cell evenly within the maximum transmission power for all the serving cells. In addition, the term "evenly" used herein may do not mean having a same numerical value with each other. That is, the terminal 100 may transmit Physical Uplink Control Channel (PUCCH) and Physical Uplink Shared Channel (PUSCH) signals, which are uplink control signals for the primary cell, and can make a larger maximum transmission power be allocated to the primary cell than the secondary cell in a predetermined range through the control signals. In consideration of such a case, it is to be noted that the allocation of a larger maximum transmission power to the primary cell than the secondary cell in a predetermined range (e.g. an allocation of 6 watts for the maximum transmission power to the primary cell and 4 watts for the maximum transmission power to the secondary cell) may be regarded herein as being evenly divided for the primary cell and the secondary cell.

In this state, the terminal 100 may determine whether there exists a bearer established already (S107). In other words, the terminal 100 may check the quality-of-service class identifier (QCI) to determine whether there exists a bearer established already. If it is determined that a bearer corresponding to a particular service such as the packet-based voice call service exists, the terminal 100 concentrates the output power to the primary cell providing the service such that more maximum transmission power can be allocated to the primary cell (S109).

In other words, the terminal may determine the output powers such that a larger maximum transmission power is allocated to the primary cell than the secondary cell as shown in the right side (b) of FIG. 4. For example, the power allocation may be adjusted from a evenly divided state that the maximum transmission power for the primary cell is 6 watts and the maximum transmission power for the secondary cell is 4 watts to another state that the maximum transmission power for the primary cell is 9 watts and the maximum transmission power for the secondary cell is 1 watt and the maximum transmission power for the primary cell is close to the maximum transmission power for all the serving cells.

In addition, the terminal 100 may transmit a power headroom report (PHR) including information on the maximum transmission power allocated for each carrier to the base station 200, so that the base station 200 may perform a resource control operation more efficiently based on the power headroom report in such a manner that no resources are wasted.

The terminal 100 may continue the power control operation S109 while the bearer identified in the operation S107 exists. When the bearer is determined to be terminated (S111), that is, when a preset service is terminated, the terminal may control again such that the maximum transmission power is evenly divided for the cells.

Meanwhile, the terminal 100 according to an exemplary embodiment of the present disclosure may perform power control in further consideration of the reference signal received power.

Such a process will now be described with reference to FIG. 5.

FIG. 5 is a flowchart illustrating a method of controlling the terminal output power during the carrier aggregation operation according to another exemplary embodiment of the present disclosure. As described with reference to FIG. 3, when it is determined that the carrier aggregation operation is to be performed (YES in operation S201) in a state that the output power is concentrated for a single activated cell before the carrier aggregation operation (S203), the terminal 100 may evenly divide the maximum transmission power for the cells (S205).

In this state, the terminal 100 may determine whether there exists a bearer established already (S207). In other words, the terminal 100 may check the quality-of-service class identifier (QCI) to determine whether there exists a bearer established already. When it is determined that a bearer corresponding to a particular service such as the packet-based voice call service exists, the terminal 100 may further check the reference signal received power (RSRP) to determine whether the reference signal received power is less than the predetermined threshold (S209). Only when it is determined that the reference signal received power is less than the predetermined threshold (e.g. 100 dBm), which indicates a weak signal strength, the terminal 100 may concentrate the output power to the primary cell such that more maximum transmission power is be allocated to the primary cell (S211).

Next, the terminal 100 may transmit the power headroom report (PHR) including the information on the maximum transmission power allocated for each carrier to the base station 200, and may maintain this power allocation state until the bearer is terminated (S213).

As described above, the terminal 100 according to the present disclosure may evenly allocate the transmission powers for the primary cell and the secondary cell, when a particular service such as a VoLTE service is not being used, so as to prevent unnecessary waste of power resources. Meanwhile, while the particular service such as the VoLTE service is being used, the terminal 100 may concentrate the power resources on the primary cell, so as to prevent the call drop of the packet voice call.

Also, since the base station 200 may allocate resources in consideration of the maximum transmission power (Pmax·c)

of each carrier, the base station 200 can achieve the quality of service similar to that attainable in case of using a single carrier even in a weak field area. Also, by concentrating the power resources on the primary cell only in the weak field area, it is possible to prevent the waste of uplink power resources in a region where the signal quality is sufficient while enabling stable packet voice call services in the weak field area.

The terminal power control method and the apparatus for the same during the carrier aggregation operation according to exemplary embodiments of the present disclosure have been described above. The terminal power control method during the carrier aggregation operation according to the embodiments of the present disclosure may be provided in a form of a computer-readable storage medium suitable for storing computer program instructions and data.

In particular, the computer program according to the present disclosure is executable by an apparatus supporting a carrier aggregation in a wireless communication system. When executed, the program may cause the apparatus to execute: setting communications with a primary cell and a secondary cell according to a carrier aggregation operation; performing a power control such that transmission powers for the primary cell and the secondary cell are divided within a range of a maximum transmission power; and, when a bearer established already is identified, determining the transmission powers for the primary cell and the secondary cell such that more transmission power is applied to the primary cell than to the secondary cell.

The program may be recorded in a computer-readable storage medium. The storage medium may store program instructions, data files, data structures, and a combination thereof. Any device capable of storing data that may be readable by a computer system may be used for the storage medium. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, and a flash memory, all of which are hardware devices suitable for storing the computer program instructions and data.

The computer-readable storage medium may also be distributed over network coupled computer systems, so that the computer-readable codes are stored and executed in a distributed computing fashion. In addition, functional programs, codes, and code segments for implementing the present disclosure can be inferred easily by programmers in the art based on the present description.

The description set forth above is provided merely to illustrate exemplary embodiments of the disclosure but is not intended to limit the disclosure to specific configurations and functions. Those skilled in the art will be able to make adaptations, modifications, and variations on the examples without departing from the scope of the present disclosure.

The present disclosure relates to a method of controlling the output power of the terminal and, more particularly, to a method of controlling the output power of the terminal during a carrier aggregation operation, which variably controls the output power for each carrier according to a type of a service to control the quality of service of the terminal when the terminal performs the carrier aggregation (CA) operation. Also, the present disclosure relates to an apparatus suitable for the method.

According to the present disclosure, the terminal determines the existence of a bearer established already while performing the carrier aggregation operation to control the power allocation such that more transmission power is allocated for the primary cell when there exists a bearer established already for a particular service such as the VoLTE service. As a result, the present disclosure facilitate high quality services according to a service using situation of the terminal, thereby allowing to provide mobile communication services more efficiently and contributing to the spread of a 5G mobile communication system. The present disclosure is industrially applicable since it actually can be implemented obviously and has a sufficiently high possibility of commercialization or sales.

What is claimed is:

1. In an apparatus supporting a carrier aggregation in a wireless communication system, a method of controlling an output power of a terminal during the carrier aggregation, comprising:

setting communications with a primary cell and a secondary cell according to a carrier aggregation operation;

performing a power control such that transmission powers for the primary cell and the secondary cell are divided within a range of a maximum transmission power; and when a bearer established already is identified, determining the transmission powers for the primary cell and the secondary cell such that more transmission power is applied to the primary cell than to the secondary cell, wherein the determining the transmission powers comprises: when the bearer established already is identified, determining whether a reference signal received power (RSRP) is less than a predetermined threshold, and when it is determined that the reference signal received power is less than the predetermined threshold, determining the transmission powers for the primary cell and the secondary cell such that more transmission power is applied to the primary cell than to the secondary cell.

2. The method of controlling the output power of the terminal during the carrier aggregation according to claim 1, wherein the bearer established already is identified through a quality of service class identifier (QCI).

3. The method of controlling the output power of the terminal during the carrier aggregation according to claim 2, wherein, when the bearer for a packet-based voice call service is identified from the quality of service class identifier, the transmission powers for the primary cell and the secondary cell are determined such that more transmission power is applied to the primary cell than to the secondary cell.

4. The method of controlling the output power of the terminal during the carrier aggregation according to claim 1, further comprising, after determining the transmission powers:

transmitting a power headroom report (PHR) including information on the transmission power determined for each cell to a base station.

5. A non-transitory computer-readable storage medium storing programs thereon, the instructions when executed by a processor on a user device causing the processor to execute a method of controlling an output power of a terminal during the carrier aggregation, wherein the method comprises:

setting communications with a primary cell and a secondary cell according to a carrier aggregation operation;

performing a power control such that transmission powers for the primary cell and the secondary cell are divided within a range of a maximum transmission power; and when a bearer established already is identified, determining the transmission powers for the primary cell and the secondary cell such that more transmission power is applied to the primary cell than to the secondary cell,
wherein the determining the transmission powers comprises:
 when the bearer established already is identified, determining whether a reference signal received power (RSRP) is less than a predetermined threshold, and
 when it is determined that the reference signal received power is less than the predetermined threshold, determining the transmission powers for the primary cell and the secondary cell such that more transmission power is applied to the primary cell than to the secondary cell.

6. An apparatus supporting a carrier aggregation in a wireless communication system, comprising:
 a carrier aggregation processor configured to set communications with a primary cell and a secondary cell according to a carrier aggregation operation;
 a determiner configured to determine whether there exists a bearer established already while the carrier aggregation operation is performed by the carrier aggregation processor; and
 a power controller configured to divide transmission powers for the primary cell and the secondary cell within a range of a maximum transmission power during the carrier aggregation operation, and determine the transmission powers for the primary cell and the secondary cell such that more transmission power is applied to the primary cell than to the secondary cell when the bearer established already is identified to exist by the determiner,
wherein
 when the bearer established already is identified, the determiner is configured to determine whether a reference signal received power (RSRP) is less than a predetermined threshold, and
 when it is determined that the reference signal received power is less than the predetermined threshold, the power controller is configured to determine the transmission powers for the primary cell and the secondary cell such that more transmission power is applied to the primary cell than to the secondary cell.

7. The apparatus of claim 6, wherein the bearer established already is identified through a quality of service class identifier (QCI).

8. The apparatus of claim 6, wherein the power controller transmits a power headroom report (PHR) including information on the transmission power determined for each cell to a base station.

* * * * *